United States Patent Office 3,036,204
Patented May 22, 1962

3,036,204
WELDING MACHINE
Hermann W. Stieglitz, Marblehead, Fraser B. Jacob, Lynn, and Leon D. McIlvin, Lynnfield, Mass., assignors to Seton Corporation, Providence, R.I., a corporation of Delaware
Filed Apr. 25, 1960, Ser. No. 24,591
4 Claims. (Cl. 219—101)

This invention relates to welding apparatus capable of use in welding railroad rails or similar elongated objects and more particularly to welding apparatus for that purpose incorporating a fixed insulated platen which supports one of the objects and a movable head which supports the object to be welded to the first.

In apparatus of this type massive elongated structures such as rails are frequently welded together to form a continuous length that may be several hundred feet long. Each rail section is very heavy and quite difficult to manipulate but must be accurately aligned with the previously welded sections of the continuous rail so that there be proper alignment between the flange portions, the web portions and the head portions of the two sections.

It is a principal object of this invention to provide a welding apparatus in which the fixed and movable platen structures are each provided with improved aligning and clamping means so that the rails are easily aligned and held properly against movement relative to the platens during the welding operation. There are two principal operations in rail welding—a quick and proper aligning of the massive members and the actual welding operation. Most apparatus which perform this task includes a fixed platen and a movable platen. In the welding operation current flows from the fixed platen into the rail section carried thereby and across the interface between the rail sections and to the other rail section and then to the electrode associated with the movable platen. This current provides localized heating at the interface between the abutting rail portions, so that that area is heated. When this occurs heavy pressure is quickly applied by pushing the movable rail head and its rail toward the fixed head and its rail to make the weld. The flash and upset at the welded joint are then removed. Provision must be made for the operator to observe the aligning of the rail sections and the welding operation itself. In addition the current carrying electrodes must be positioned closely adjacent the interface. Those factors resulted in the rail welding machines of the prior art having their aligning apparatus located at comparatively remote points from the interface so that it was a difficult problem to accurately position the rails with respect to each other for the welding process.

Accordingly, another object of the invention is to provide an improved rail welding apparatus in which accurate positioning of the members to be welded is easily achieved.

Still another object of the invention is to provide in a rail welding apparatus an improved means for adjusting the position of the rails to be welded.

Another object of the invention is to provide a simple and ruggedly constructed rail welding apparatus in which the rails to be welded may be positively located and properly secured relative to one another during the welding operation.

In accordance with the present invention there are provided a set of vertical aligning members and a set of horizontal aligning members each of which have clamping portions that are adapted to be positioned in close proximity to the ends of the rails that are to be welded. These aligning members are controlled by the operator and are arranged so that a clear view of the interface is provided without any impairment of the efficiency of the electrode arrangement. In this manner the critical positioning of the adjacent rail ends may be accurately and easily controlled. Although the aligning means do provide a degree of clamping, supplemental heavy duty clamping mechanisms are provided at a more remote portion from the weld interface which securely maintains the rails against longitudinal movement during the welding operation particularly during the push-up portion thereof. The longer portion of the rail (normally consisting of a plurality of previously welded sections) is first aligned approximately in proper position in the fixed platen structure and securely clamped there with the associated horizontal and vertical aligning means. The rail portion to be welded thereto is introduced into the movable platen and moved by that structure into position adjacent the continuous end portion. Its aligning mechanisms are then subjected to a low fluid pressure in a cushioning and locating operation and then the cooperating members disposed opposite these members are operated to mechanically align the adjacent ends of the sections to be welded as desired against this fluid pressure. When the ends are accurately and precisely aligned as desired, a high fluid pressure is applied to the aligning mechanisms so that the end portions thereof are fixed accurately and securely. Pressure is applied to the main hydraulic clamping members to clamp the rail securely for the welding operation. When the rails are so aligned the movable platen is operated bringing the opposing end portions into contact and electric current from the electrodes flows across the interface to heat the metals at that point. When they are sufficiently heated, high pressure is applied to drive the two sections together producing a weld and driving metal out from the weld area as upset. The clamps on the fixed platen are then freed and the weld section is moved out of the weld area to the shearing mechanism. Hydraulic operated jaws are then driven through the weld upset to remove it and the continuous rail portion is moved relative to the fixed platen for proper positioning in anticipation of the next weld.

The novel features which are believed characteristic of the invention are set forth with particularity in the appended claims. Details of the organization and method of operation of the invention, together with further objects and advantages thereof, will be best understood by reference to the following description taken in conjunction with the accompanying drawings, in which:

Figure 1:
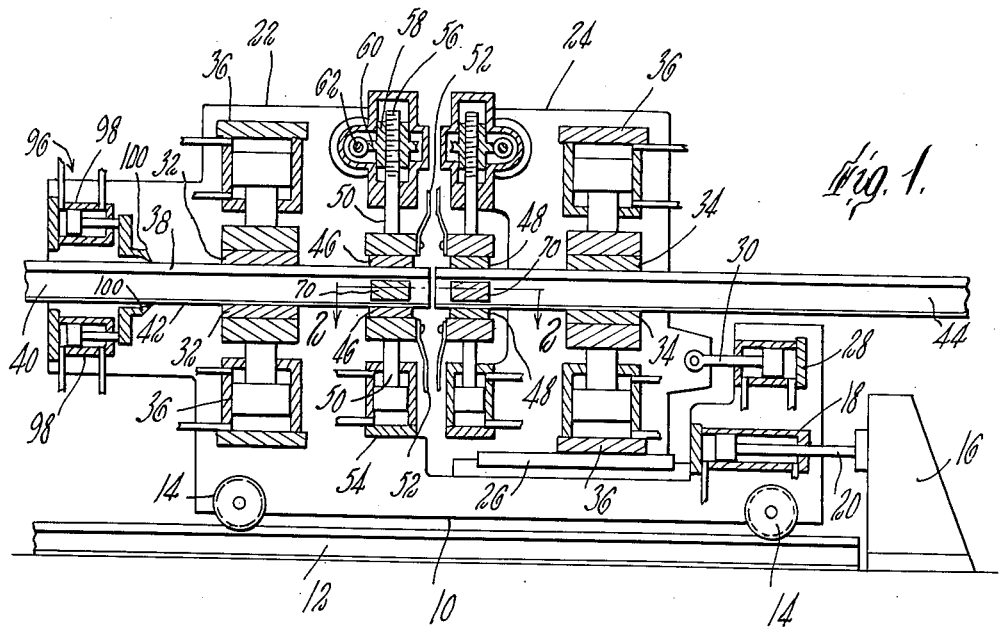
FIG. 1 is a partly sectional, partly schematic, side elevational view of a welding machine constructed in accordance with the present invention.

With reference to FIG. 1 it will be seen that the welding machine of the invention includes a massive base 10 which is mounted for reciprocating movement along a pair of rails 12 as supported by wheels 14. A fixed abutment 16 and hydraulic cylinder 18 which has a piston rod 20 that acts against the fixed abutment controls the reciprocating movement of the carriage.

Mounted on the carriage is a fixed platen structure 22 and a movable platen structure 24. The movable platen structure is mounted on a set of ways 26 and is reciprocated in the same general direction as the carriage itself along those ways by a hydraulic cylinder 28 whose piston rod 30 is connected to the movable platen structure.

Figure 3:
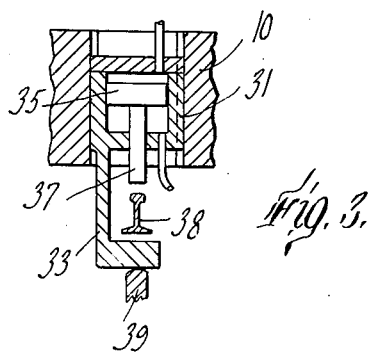
FIG. 3 is a sectional partial view of a modification of the apparatus of FIG. 2.

Each platen structure carries a pair of main clamping members 32, 32, 34, 34 each of which is actuated by a large high pressure hydraulic cylinder 36. Another form of main clamp is shown in FIG. 3, wherein a cylinder 31 is slidably mounted in the main frame 10, and has a depending arm 33 arranged to support the rail 38 from beneath. A piston 35 in said cylinder has its piston rod 37 arranged for engagement with the top of rail 38. A stop 39 is provided beneath arm 33 to define its open position. The upper clamp 32 is adapted to engage the head portion 38 of the indeterminate length of previously welded rail section 40 and the lower clamp, oppositely disposed is adapted to engage the flange portion 42 of the same rail. Similarly the clamps 34 engage the head and flange portions of the rail section 44 to be welded to the long member. Positioned adjacent the inner end of each plates is a set of electrodes 46, 48 respectively. The electrodes 46, associated with the fixed platen structure, are disposed on opposite sides of the rail adjacent the welding area and are insulated from their supporting members 50 by suitable means. Electric current of suitable magnitude for the welding operation is applied to these electrodes by means of leads diagrammatically indicated by elements 52. The electrodes 48 associated with the movable platen 24 are similarly supported and in the conventional manner provide in return path for the electric current that flows through the rails in the welded area.

The bottom electrode member of each set is moved toward and away from the rail by means of a hydraulic cylinder 54 to which fluid pressure is applied under low or high pressure via an associated valving system. The opposite electrode of each set is positioned by mechanical means which include a threaded shaft 56 which forms an extension of the upper electrode support 50. Each threaded shaft cooperates with a nut member 58 that has a worm gear 60 formed integrally therewith and is driven by cooperating worm 62 such that the upper electrode of each pair may be moved toward and away from the rail and accurately positioned relative thereto as desired to provide vertical alignment of the rail end portions 64, 66.

Figure 2:
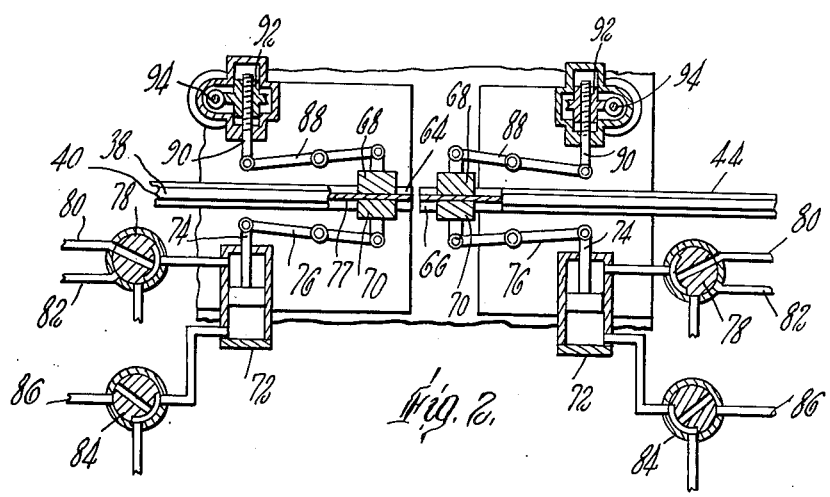
FIG. 2 is a top elevational view, partly in section, of the welding apparatus taken along the line 2—2 of FIG. 1.

Horizontal alignment of the rails is also achieved by aligning members 68, 70 positioned immediately adjacent the ends 64, 66 of the rail sections to be welded. This structure is shown in FIG. 2. As in the case of the vertical aligning clamps there are a set of clamps associated with each rail member. One clamp of each set is operated by a hydraulic cylinder 72 whose piston rod 74 is connected by a pivoted linkage 76 to the associated clamping member 70 so that that clamp may be moved toward and away from contact with the rail web 77. Due to the necessity to provide adequate space in the vicinity of the weld area for the welding current conductors and for the operator to observe both the alignment and welding operations the horizontal aligning cylinders are not placed immediately in line with their associated clamping members as are the vertical aligning clamps but rather are offset so that they are positioned at a more remote point from the weld area. Valve means 78 associated with each cylinder 72 permit low pressure to be applied to the clamp from line 80 and high pressure to be applied from line 82 while valve 84 permits pressure to be applied from line 86 to release the aligning clamp. (Similar valving arrangements are associated with cylinders 36 as indicated above.) A similar linkage 88 is utilized for the cooperating aligning clamp member of each set but that clamp member is operated by means of a screw threaded shaft 90 and nut 92 which is rotated by means of a worm gear arrangement 94 similar to that utilized for the vertical aligning clamps shown in FIG. 1. Both the horizontal and vertical aligning clamps and main clamps associated with the movable platen are mounted thereon and thus move therewith while the aligning clamps and main clamping mechanism associated with the fixed platen are mounted thereon.

In operation, the rail 40 of indeterminate length to which a rail portion has just been welded is positioned in the fixed platen structure 22 and a rail section 44 to be welded thereto is loaded into the movable platen structure 24. Low pressure is applied to the hydraulic cylinders associated with the vertical and horizontal aligning clamp mechanisms such that the associated clamp heads are moved into contact with the rail portions with which they coact. Then the cooperating screw drive mechanisms are actuated by the operator to move the end portions of the rail section to be welded so that they are accurately aligned relative to one another. The control of the rail ends by the screw mechanisms is facilitated by the moderate resistance applied by the fluid pressure which opposes their movement. Due to the fact that the aligning clamp heads are positioned immediately adjacent the end of the rails in close proximity to the weld interface an accurate alignment of the members is easily obtained. When the rail end portions are properly positioned pressure of the higher magnitude is applied to the aligning clamps to secure them in that position and then the high pressure main hydraulic clamps 32, 34 are energized to insure that the rails will remain properly positioned throughout the welding operation.

Electric current is then applied to the welding electrodes associated with the fixed platen 22 and flows into the continuous rail portion 40. The hydraulic cylinder 28 moves the movable platen 24 toward the fixed platen 22 so that the rail end 66 is placed in proximity with the fixed rail end 64 and current flows across the gap, heating the rail metal to a condition suitable for welding. When that condition is achieved a higher magnitude of force is applied by cylinder 28 to the movable platen 24 driving the end of rail section 44 into the end of the fixed continuous rail portion 40 and forcing molten metal outwardly in an upsetting operation so that an excellent weld is formed. The movable platen 24 is then withdrawn after its associated clamps have been released and the main clamp alone is operated to move the entire rail relative to the fixed platen toward the upset removing apparatus 96 where the cylinders 98 operate cutters 100 to drive them through the upset metal removing it in a clean, sharp manner.

The operator's control panel is located immediately to the left of the weld area shown in FIGS. 1 and 2 and to the right of the hydraulic cylinder 72 shown in FIG. 2. Due to the arrangement of the horizontal aligning clamps 68, 70 there is a substantial area clearly visible to the operator so that he may be freely able to inspect the alignment of the rails prior to welding and to appropriately control the welding operation to produce the desired weld of high quality. In the preferred embodiment the heavy current leads for the weld electrodes are connected from the rear of the electrode structures as viewed in FIG. 1, connections there shown being so located merely to indicate their existence. Thus it will be seen that the invention provides a markedly improved arrangement of a rail welder capable of accurately and expeditiously executing repetitive welds in forming a continuous length of rail.

While there has been shown and described herein a specific embodiment of the invention it will be understood that the invention is not intended to be limited thereto or to details thereof and departures may be made therefrom within the spirit and scope of the invention as defined in the claims.

We claim:

1. Apparatus for welding sections of rails to form a continuous length thereof comprising a welding electrode adapted to be positioned immediately adajacent an end of an indeterminate length of continuous rail, means including a second welding electrode adapted to position a rail section to be welded to said continuous length adjacent said end with its axis horizontal and in a predetermined vertical position, said second welding electrode adapted to be positioned immediately adjacent the end of the rail section to be welded to said indeterminate length, aligning means adapted to control the horizontal and vertical positioning of the rail sections comprising a pair of vertical clamp members and a pair of horizontal clamp members adapted to coact with each rail section, each clamp member adapted to be positioned immediately adjacent the end of the associated rail section when those sections are in position to be welded together, each said welding electrode comprising a portion of at least one of said clamp members associated with each rail section for conducting welding current relative to the associated rail section during a welding operation, one clamp member of each horizontal cooperating pair including an operator means offset from said one clamping member in a longitudinal direction along the rail away from the weld interface between the ends of said rail sections and a mechanical linkage connecting the clamping element and the operator means, mechanical operating means associated with one clamp member of each pair for accurate positioning of that clamp member, fluid operating means associated with the opposing clamp member of each pair and main clamping means for securing the rail portions positively as aligned by said aligning means during the welding operations, said main clamping means being disposed along said rail portions at a point more remote from the weld interface than said aligning clamp structures.

2. Apparatus for welding sections of rails to form a continuous length thereof comprising fixed support means including a first welding electrode means to horizontally support an indeterminate length of continuous rail, movable support means including a second welding electrode to position a rail section to be welded to said continuous rail with ends thereof adjacent one another and with its axis horizontal and in a predetermined vertical position, aligning means adapted to control the horizontal and vertical positioning of the rail sections comprising a pair of vertical clamp members and a pair of horizontal clamp members associated with each said support means and adapted to contact the associated rail section, each clamp member being positioned immediately adjacent the end of the associated rail section adjacent the weld interface when those sections are in position to be welded together, said electrodes being associated with the vertical pair of said clamp members and adapted to pass welding current relative to the associated rail during a welding operation, mechanical adjusting means associated with one clamp member of each said pair adapted to accurately position the associated rail section and fluid actuating means associated with the opposing clamp member of each pair adapted to coact with said mechanical adjusting means for aligning and clamping the rail sections in position for welding, one clamp of each horizontal pair having its operating means offset from said clamping mechanism in a longitudinal direction along the rail section away from the weld interface and a mechanical linkage connecting the clamp member and the operating means, and main clamping means for securing said rail sections positively as aligned by said aligning means during welding operations, said main clamping means being disposed along said rail portions on platen members at points more remote from the weld interface than said aligning means.

3. Apparatus for welding sections of rails together to form a continuous length comprising a fixed platen structure adapted to support horizontally a length of rail with the end thereof adjacent a first pair of welding electrode members, a movable platen structure adapted to position a section of rail with its axis horizontal and in a predetermined vertical position so that its end to be welded is adjacent the end of the length held by the fixed platen and adjacent a second pair of welding electrode members, vertical aligning means associated with each platen and including the associated pair of welding electrode members, one of said electrode members being operated by fluid means, the other being operated by mechanical means adapted to move the associated electrode member toward and away from the rail for aligning and clamping purposes, horizontal aligning means associated with each platen comprising a pair of clamping members, one of said clamp members being operated by fluid means, the other being operated by mechanical means adapted to move the associated aligning clamp toward and away from the rail for aligning and clamping purposes, means to apply low pressure to each said fluid means prior to operating the mechanical means and means to apply high pressure to each said fluid means after the rail portions have been properly aligned by said mechanical means to securely maintain the rail portions in proper alignment, and main hydraulic clamping means associated with each platen and located at a point more remote from the weld interface between the ends of the rail sections than said aligning means for positively securing said rail sections during the welding operation.

4. Apparatus for welding massive elongated metallic members together to form a continuous length comprising a fixed platen structure including a first pair of welding electrode members adapted to horizontally support a first elongated member with an end thereof adjacent said first pair of welding electrode members, a movable platen structure adapted to position a second elongated member with its axis horizontal and in a predetermined vertical position so that an end thereof is adjacent an end of the first elongated member held by the fixed platen structure such that an interface is defined therebetween, said movable platen structure including a second pair of welding electrode members, vertical rail aligning means including a pair of clamping members associated with each pair of welding electrodes, horizontal aligning means associated with each platen comprising a pair of clamp members positioned in substantial alignment with the associated pairs of vertical clamp members, one of said clamp members of each pair being operated by hydraulic operating means, the other clamp member of each pair being operated by mechanical operating means comprising a threaded shaft and a cooperating drive member adapted to move the associated shaft and clamp member toward and away from the elongated member for aligning and clamping purposes, each of said hydraulic operating means and said mechanical operating means being offset from its associated clamp member in a longitudinal direction along the respective elongated member away from said interface, means to initially apply a low pressure to each of said hydraulic operating means prior to actuating the associated mechanical operating means for alignment purposes, means to apply a higher pressure to said hydraulic operating means after the elongated members have been properly aligned by said mechanical operating means to securely maintain each elongated member in proper position, and main hydraulic clamping means associated with each platen and located at a point more remote from the interface between the ends of the elongated members than said aligning means, said main hydraulic clamping means being adapted to positively secure said elongated members during the welding operation.

References Cited in the file of this patent
UNITED STATES PATENTS

| | | |
|---|---|---|
| 766,288 | Rietzel | Aug. 2, 1904 |
| 2,250,869 | Jones et al. | July 29, 1941 |
| 2,276,354 | Trainer | Mar. 17, 1942 |
| 2,302,420 | Chapman | Nov. 17, 1942 |
| 2,396,002 | Frischmann | Mar. 5, 1946 |
| 2,480,863 | Kerr et al. | Sept. 6, 1949 |
| 2,696,547 | Felton et al. | Dec. 7, 1954 |
| 2,787,698 | Schlatter et al. | Apr. 2, 1957 |
| 2,911,516 | Cox | Nov. 3, 1959 |